Dec. 30, 1941.  E. E. TEACH  2,267,959
CONTROLLING DEVICE
Filed Dec. 13, 1940
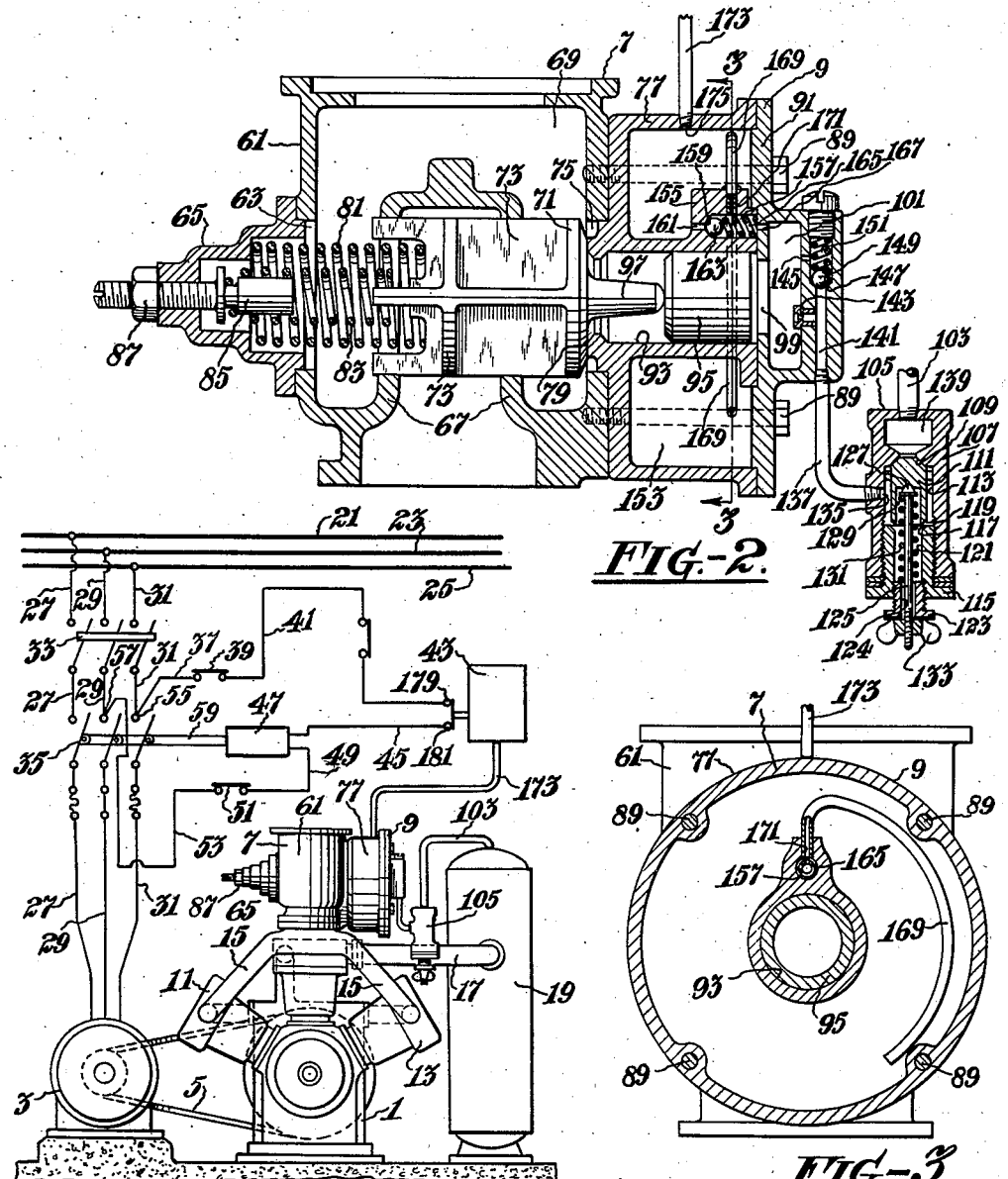
INVENTOR
Edwin E. Teach
BY
HIS ATTORNEY Patented Dec. 30, 1941

2,267,959

UNITED STATES PATENT OFFICE 2,267,959

CONTROLLING DEVICE

Edwin Everett Teach, Painted Post, N. Y., assignor to Ingersoll-Rand Company, New York, N. Y., a corporation of New Jersey Application December 13, 1940, Serial No. 370,012

8 Claims. (Cl. 230—31)

This invention relates to a controlling device and, more particularly, it relates to a device for controlling the operation of a fluid compressor.

In the operation of an electric motor driven fluid compressor it is usually desirable, when the receiver pressure exceeds a predetermined pressure value, to stop the compression of further fluid by shutting off the supply of fluid to the compressor (commonly termed "unloading"). It is also customary upon unloading the compressor to stop the operation of the motor. However, if the load on the compressor is such that the pressure in the receiver falls rapidly after the compressor has been unloaded it is necessary to recommence the supply of fluid to the compressor (commonly termed "reloading") in order that more fluid may be compressed. Under such conditions the compressor will reload shortly thereafter and the electric motor will again be started. This form of operation leads to unsatisfactory results since the motor is compelled to start and stop at short intervals which, in time, impairs the efficiency of the motor.

Accordingly, it is an object of this invention to provide a controlling device for an electric motor driven compressor which will allow the motor to operate a predetermined time after the compressor is unloaded.

Another object is to provide a controlling device which will stop the operation of the electric motor a predetermined time after the compressor is unloaded.

A still further object is to provide a controlling device for an electric motor driven compressor which will permit unloading and reloading of the compressor within a predetermined time while the motor is operating.

These and further objects will be apparent from the following description and drawing in which like numerals refer to the same parts.

Figure 1 is a plan view of an electric motor driven fluid compressor provided with a controlling device constructed in accordance with the principles of the present invention.

Figure 2 is a sectional view of the controlling device shown in Figure 1, and

Figure 3 is a view taken along line 3—3 of Figure 2.

The fluid compressor 1, shown in Fig. 1, is driven by an electric motor 3 through the belt 5. The compressor is provided with an intake unloader 7 and a controlling device 9. Fluid is supplied to the compressor cylinders 11 and 13 through the intake unloader 7 and the pipes 15. The fluid compressed by the compressor is discharged through the pipe 17 to the receiver 19.

Electric power for energizing the motor 3 is supplied by the main lines 21, 23 and 25 through wires 27, 29 and 31 respectively. In the wires 27, 29 and 31, leading to the motor, is a manually operated switch 33 and a second switch 35 magnetically operated and commonly termed "a magnetic starter switch." The switch 33 may, of course, be opened or closed at will by the operator while the switch 35 is controlled by a control circuit connected thereto. This control circuit consists of a wire 37, a starter interlock 39, wire 41, having a manually operated switch 42 therein for opening the circuit, a pressure operated switch 43, wire 45, solenoid 47, wire 49, overload relay 51 and wire 53.

The circuit is connected to the wire 31 at terminal 55 by wire 37 and to the wire 29 at terminal 57 by wire 53. Thus, if switch 33 is closed, current may then flow through the circuit, assuming that the pressure switch 43 is closed. When current flows through the circuit the solenoid 47 will be energized. Energization of the solenoid will move the rod 59 toward the left to close switch 35. This will start the motor and it will continue to operate until the circuit is opened which causes deenergization of the solenoid with the result that the rod 59 is moved toward the right.

The intake unloader 7, as shown in Fig. 2, consists of a casing 61 provided with an opening 63 at one side thereof which is closed by a cover 65. A pair of walls 67 formed integral with the casing 61 extend within the casing chamber 69 to form a guide for the cylindrical valve 71 having ribs 73. A second opening 75, opposite the opening 63, is formed in the casing 61 and into which the control device casing 77 extends.

The wall of the casing 77 extending into the opening 75 provides a seat 79 for the valve 71. A spring 81 extending through opening 63 and resting on the cover 65 of the valve 71 normally maintains valve 71 against the seat 79. In this position fluid may flow by the valve 71 to the compressor inlet. A second spring 83 also extends through the opening 63 and bears on an adjusting rod 85 threadedly engaging the cover 65. The position of this rod may be altered at will to change the spring tension and is securely locked in any desired position by the lock nut 87. This second spring serves as a cushioning device for the valve 71 when the valve is moved to its closed position. In the closed position of the valve the ribs 73 are aligned with the walls 67 to prevent the flow of fluid to the pipes 15 of the compressor. In this position the compressor is said to be unloaded. Whereas, when the valve 71 is in the position shown in Fig. 2, the compressor is said to be loaded.

The control device casing 77 is secured to the casing 61 by the bolts 89 which also serve to clamp the cover 91 to the casing 77. In the central portion of the casing 77 is a piston chamber 93 in which a piston 95, bearing against a projection 97 formed on the valve 71, is adapted to reciprocate. Obviously, movement of the piston 95 toward the left will move the valve 71 toward the left to unload the compressor. The spring 81, on the other hand, will move the valve 71 and the piston 95 toward the right when the compressor is reloaded.

The cover 91 has a central opening 99 of slightly smaller diameter than the piston chamber 93 and communicates therewith. By making the opening 99 of smaller diameter the wall of the cover 91 can serve as a stop for rightward movement of the piston. This opening permits communication between the chamber 101 formed in the cover 91 and the piston chamber 93. This chamber is designed to receive fluid under pressure from the receiver tank 19 of the compressor upon a predetermined pressure in order that the piston may be moved by the fluid pressure toward the left to unload the compressor.

In order that this may be accomplished, it will be noted that the conduit 103 connects the receiver 19 with the valve 105. This valve consists of a body 107 having a valve seat 109 and a valve 111. The bore 113 in the valve body 107 is threaded at its outer end to receive a bushing 115 which serves to close the bore and provide a second valve seat 117 against which the valve surface 119 may seat. The passage 121 in bushing 115 is likewise threaded at its outer end in order to receive a second bushing 123. Through the bore 124 of the bushing 123, the passage 121 and the bore 113 extends a plunger 125 provided at its inner end with a head 127 which bears on the bottom surface of a recess 129 formed in the valve 111 to normally urge the valve 111 against the seat 109. It should be noted that the bore 124 is of greater diameter than the diameter of the plunger 125. A spring 131 bears on the valve head 127 and on the bushing 123, the tension of which is adjustable by means of the hand nut 133 threadedly engaging the outer end of the plunger.

To one side of the valve body is a bore 135 to which the conduit 137, connected to the cover 91 of the controlling device, may be secured. The conduit 103 leading from the receiver 19 is connected and communicates with an inlet chamber 139 in the valve body 107. When the pressure in the receiver tank is sufficient to overcome the resistance of the spring 131, it will be apparent that the valve 111 will be raised from its seat 109 and held against its seat 117. This will allow fluid to flow from the receiver through the conduit 103, into inlet chamber 139, past the valve seat 109, through the bore 135 and conduit 137 to a passage 141 provided in the cover 91. If, now, the pressure should decrease sufficiently to enable the spring 131 to move the valve 111 against its seat 109, the flow of fluid through the valve body would cease. Any pressure fluid remaining in the controlling device and conduit 137 may then escape into the bore 113, of the valve body 107, flow by the seat 117 into the passage 121, through the portion of the bore 124, which is not filled by the plunger 125, and thence to atmosphere through passages provided in the hand nut 133.

Communication between the passage 141 and the chamber 101 in cover 91 may be through either the orifice 143, provided in the wall between the passage and chamber, or through the port 145 also provided in the common wall. The passage 141 is enlarged at its upper end and is provided with a seat 147 for the ball check valve 149. The ball check valve 149 is pressed on its seat by a spring 151 which is compressed by the screw plug 153 threadedly engaging the enlarged portion of the passage 141. This ball check valve is located below the port 145 and, consequently, it is necessary for the ball check valve 149 to be raised from its seat before fluid can flow through the port 145. Fluid supplied on the receiver when the valve 111 rises from its seat 107 will have sufficient pressure to raise the check valve from its seat and fluid may then flow into the chamber 101 through the bore 145. When fluid enters the chamber 101 it will act on the piston 95 to move the valve 71 to its unloading position.

Formed by the controlling device casing 77 and the cover 91 is an annular chamber 153 which surrounds and is separated from the piston chamber 93. In the inner wall 155 of the casing 77 is a recess 157 having a valve seat 159 adjacent the port 161 opening into the annular chamber 153. Communication between the port 161 and the recess 157 is controlled by the ball check valve 163, which is held against the seat 159 by the spring 165, retained in the recess 157 by the cover 91. The recess 157 also communicates with the chamber 101 in the cover 91 through the port 167. Communication between the recess 157 and the annular chamber 153 may also be had through the capillary tubing 169 which is secured in an appropriate bore 171 opening into the recess 157 in the wall 155.

When fluid under pressure has been supplied to the chamber 101 the fluid may pass through the port 167 into the recess 157 and since the pressure in the recess 157 is greater than the pressure in the annular chamber 153 the spring 165 will be aided in holding the ball check 163 on its seat by the pressure of the fluid. As a result, the only path for the fluid to enter the annular chamber 153 is through the capillary tubing 169.

Since this tubing restricts the flow of fluid there will be a predetermined time delay before the pressure in the annular chamber 153 is equal to the pressure in the chamber 101. The length of time involved will depend upon the length of tubing employed and the diameter of the bore of the tubing. Obviously, an orifice or other metering device could be employed.

The annular chamber 153 is connected by the tubing 173, threadedly secured to the outer wall of the casing 77 and opening through a port 175 into the annular chamber, with the pressure actuated switch 43. The pressure switch 43 need not be particularly described since it is of the common commercial type which will break the circuit between the terminals 179 and 181 upon being subjected to a predetermined pressure and thus opening the electric circuit controlling the solenoid.

Assuming that the receiver pressure reaches a value which is sufficient to open the valve 109, fluid under pressure is then supplied to the chamber 101 through port 145 and the orifice 143. The fluid pressure in chamber 101 will move the piston 95 to the left thus moving valve 71 to its unloading position. At the same time, fluid flows through the port 167 and the capillary tubing 169 to the annular chamber 153.

As has been previously explained, there will be a certain time delay before the pressure in chamber 153 is equal to the pressure in chamber 101 to the tubing 173. As a result, the pressure acting on the pressure actuated switch 43, will be insufficient to operate this switch to open the circuit until the pressures in the chambers have been equalized after the predetermined time delay. When this occurs, the circuit is broken and the motor ceases to operate. The motor and compressor thus cease operating and do not resume operation until the pressure in the receiver tank falls to a point where the pressure exerted by spring 131 is greater than the pressure in the receiver tank. At this time the spring 131 acting on valve 111 will return it to its seat 109.

Upon closing of valve 111, the valve bore 113 is vented to the atmosphere as was previously explained. As the pressure in this bore is reduced, the pressure of the fluid in passage 141 is reduced and the fluid in the piston chamber 93 and the annular chamber 153, being at a higher pressure, will begin to escape to the passage 141 and the bore 113. In order to prevent rapid reloading of the compressor, as would occur if the pressure acting on the piston was suddenly reduced, the flow of fluid from the chamber 101 is restricted by the orifice 143. This orifice provides the only path of escape for the fluid from chamber 101, since the pressure in that chamber acts with spring 151 on the ball check 149 to hold it on its seat thus preventing the escape of fluid through the port 145 into the passage 141.

The port 161 is provided in order that the pressure in the annular chamber 153 may be reduced more rapidly than would be possible if only the capillary tubing 169 were employed. With this arrangement the pressure in the annular chamber 153 is greater than the pressure in chamber 101 and, consequently, the ball check valve 163 will open against the pressure of the spring 165. Thus fluid may escape both through the capillary tubing 169 and the port 161 to the recess 157 and thence through port 167 to the chamber 101.

With a reduction of pressure in the annular chamber 153 and the tubing 173, the pressure acting on the pressure actuated switch 43 will decrease sufficiently to permit the switch to close and the motor control circuit will again be closed thus starting the motor. The switch 43 is so regulated that it will close before the compressor has been reloaded so that the motor may attain full operating speed before the valve 71 has completely opened to reload the compressor. In the event that the load on the compressor is sufficient to cause unloading of the compressor by closing of valve 71 and is capable of reducing the receiver pressure in less time than it takes to equalize the pressure in chambers 101 and 153, it is obvious that the pressure actuated switch will not open and the motor will continue to operate. When this occurs, the compressor may be unloaded and reloaded while the motor continues to operate at all times, thus increasing the efficiency and economy of operation of the compressor.

I claim:

1. A controlling device adapted for use with a fluid compressor comprising a body, an annular chamber in the body, a discharge conduit for the annular chamber, a cap on the body, an inlet chamber in the cap, a supply conduit to supply compressor discharge fluid to inlet chamber, and a capillary tube to convey fluid from the inlet chamber to the annular chamber restricting the fluid flow and provide a predetermined time delay before the pressure in the annular chamber equals the pressure in the inlet chamber.

2. The combination with a fluid compressor having an unloading mechanism and a motor for driving the compressor controlled by a pressure actuated device of a body having a piston chamber, a piston in the chamber to actuate the unloading mechanism, means to subject the piston to compressor discharge pressure at a predetermined compressor discharge pressure to actuate the unloading mechanism to unload the compressor, a second chamber in the body, means to introduce compressor discharge fluid from the first means to the second chamber at said predetermined compressor discharge pressure at a predetermined rate, means connecting the second chamber to the pressure actuated device whereby the pressure actuated device is not actuated until after the compressor has been unloaded.

3. The combination with a fluid compressor having an unloading mechanism and a motor for driving the compressor controlled by a pressure actuated device, of a body having a chamber therein to receive compressor discharge pressure fluid upon a predetermined compressor discharge fluid pressure, a piston chamber in the body communicating with the first said chamber, a piston in the piston chamber to actuate the unloading mechanism to unload the compressor in response to the compressor discharge fluid pressure, a second chamber in the body, means to delay the flow of fluid from the first said chamber to the second chamber at a predetermined time, and means to connect the pressure actuated device to the second chamber to delay the actuation thereof to a predetermined time after the compressor is unloaded.

4. The combination with a fluid compressor having an unloading mechanism and a motor for driving the compressor controlled by a pressure actuated device, of a body having a chamber therein to receive compressor discharge pressure fluid upon a predetermined compressor discharge fluid pressure, means in the body associated with the chamber responsive to the compressor discharge fluid pressure to actuate the unloading mechanism to unload the compressor, a second chamber in the body in communication with the pressure actuated device, and means between the second chamber and said chamber to delay the flow of compressor fluid to the second chamber and delay actuation of the pressure actuated device to a predetermined time after unloading of the compressor.

5. The combination with a fluid compressor having an unloading valve to control the supply of fluid to the compressor, a receiver into which the compressor discharges, a motor for driving the compressor, and fluid pressure responsive controlling means to start the motor when subjected to a predetermined fluid pressure and to stop the motor when subjected to a predetermined high pressure, of means to supply fluid under pressure to said controlling means and said unloader valve at different respective rates to delay operation of said controlling means to stop the motor.

6. The combination with a fluid compressor having a pressure fluid operated unloading valve to control the supply of fluid to the compressor, a receiver into which the compressor discharges, a motor for driving the compressor, and fluid pressure responsive controlling means to start the motor when subjected to a predetermined fluid pressure and to stop the motor when subjected to a predetermined high pressure, of means to supply fluid under pressure to said controlling means and said unloader valve at different respective rates to delay operation of said controlling means to stop the motor and means to equalize the pressures acting on said controlling means and said unloader to delay release of said unloader until operation of said controlling means to start the motor.

7. The combination with a fluid compressor having a pressure fluid operated unloading valve to control the supply of fluid to the compressor, a receiver into which the compressor discharges, a motor for driving the compressor, and fluid pressure responsive controlling means to start the motor when subjected to a predetermined fluid pressure and to stop the motor when subjected to a predetermined high pressure, of a chamber associated with said unloader and a second chamber associated with said controlling means and having a restricted passage to said first chamber, means to introduce fluid into the first chamber with substantially no obstruction and to restrict the discharge of such fluid therefrom, and means to permit discharge of fluid from the second said chamber to the first said chamber with substantially no restriction.

8. The combination with a fluid compressor having a pressure fluid operated unloading valve to control the supply of fluid to the compressor, a receiver into which the compressor discharges, a motor for driving the compressor, and fluid pressure responsive controlling means to start the motor when subjected to a predetermined fluid pressure, and to stop the motor when subjected to a predetermined high pressure, said unloading valve and controlling means being adapted to operate at different pressures, of a chamber associated with said unloading valve, a second chamber associated with said controlling means and having a restricted passage to said first chamber, means to introduce fluid into the first chamber with substantially no obstruction and to restrict the discharge of such fluid therefrom, and means to permit discharge of fluid from the second said chamber to the first said chamber with substantially no restriction.

EDWIN EVERETT TEACH.